April 21, 1942.  B. C. KATHE  2,280,240
METHOD AND APPARATUS FOR IMPINGING POWDERED MATERIAL
Filed Sept. 23, 1938  3 Sheets-Sheet 1
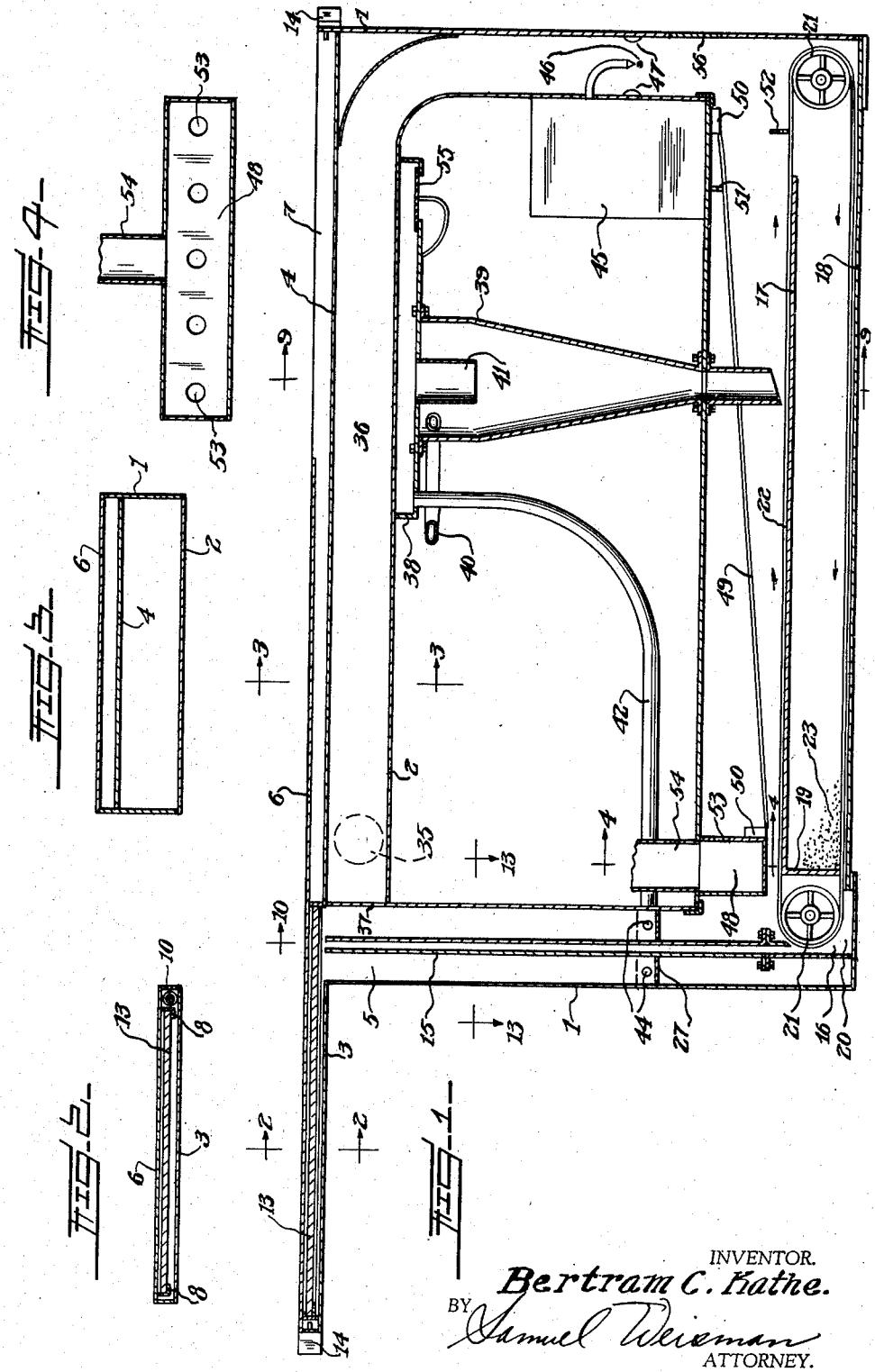
INVENTOR.
Bertram C. Kathe.
BY
Samuel Weisman
ATTORNEY.

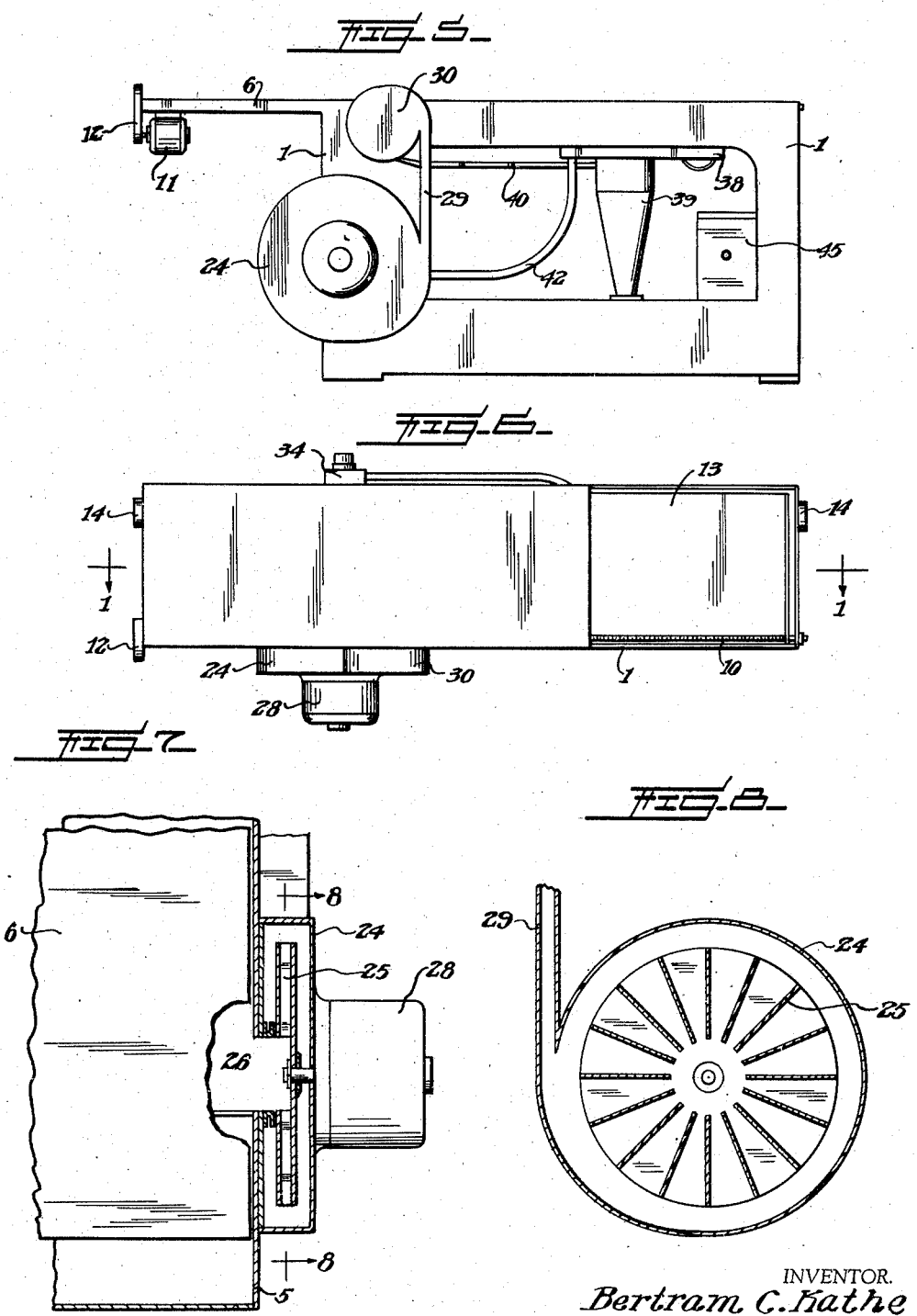

April 21, 1942.  B. C. KATHE  2,280,240
METHOD AND APPARATUS FOR IMPINGING POWDERED MATERIAL
Filed Sept. 23, 1938  3 Sheets-Sheet 3
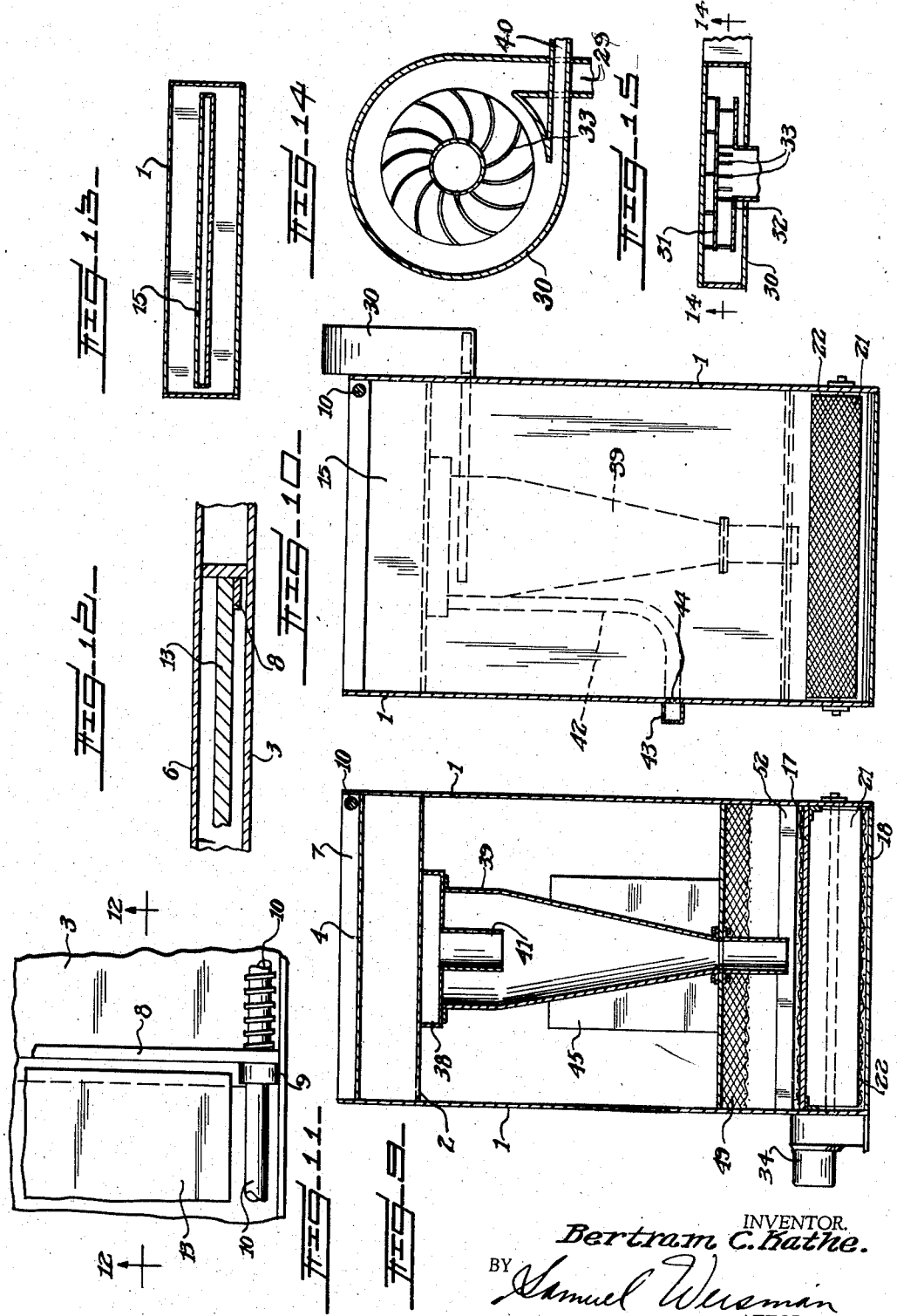
INVENTOR.
Bertram C. Kathe.
BY Samuel Wiseman
ATTORNEY.

Patented Apr. 21, 1942

2,280,240

UNITED STATES PATENT OFFICE 2,280,240

METHOD AND APPARATUS FOR IMPINGING POWDERED MATERIAL

Bertram C. Kathe, Detroit, Mich.

Application September 23, 1938, Serial No. 231,349

7 Claims. (Cl. 91—7.5)

The present invention pertains to a novel method of and apparatus for impinging powdered material on a form. More specifically, the invention pertains to the application of material for the purpose of imparting conductivity to the surface of an object such as a wax or similar form used in making electrotypes. The powdered material may be either graphite or a reagent adapted to react with a metallic solution as described in my co-pending application Serial No. 202,674, filed April 18, 1938.

Several of the objects and advantages of the invention are enumerated at the end of the detailed description. Briefly, the principal object of the invention is to provide means for applying the material, for the purpose described above, in an efficient and safe manner.

To effect this general purpose, the material is drawn by suction through a nozzle and impinged against a downwardly facing form. This position of the form permits the excess material to fall into a suction chamber and also prevents the accumulation of excess material in the recesses of the form. The suction in the suction chamber is created by a blower which withdraws air and the excess material from the chamber. The blower delivers the mixture of air and material to a centrifugal separator in the form of a volute. The material separated in the volute is returned to the supply and feeding means. The air discharged from the volute, with a small quantity of material is subjected to electrostatic repulsion and thus returned to the storage chamber and feeding means. Thus, practically all of the excess material is recovered and, with the apparatus substantially air-tight, the danger of occupational disease is eliminated. Such complete recovery of the material leaves only a minute quantity in suspension, which may be vented out of the building. The danger of explosion is thereby avoided.

Other objects and advantages of the invention will appear as the description proceeds.

The invention is fully disclosed by way of example in the following description and in the accompanying drawings, in which—

Figure 1 is a longitudinal section of the device;

Figure 2 is a section on the line 2—2 of Figure 1;

Figure 3 is a section on the line 3—3 of Figure 1;

Figure 4 is a section on the line 4—4 of Figure 1;

Figure 5 is a side elevation;

Figure 6 is a plan view;

Figure 7 is a detail end view, partly in section, to show the blower;

Figure 8 is a section on the line 8—8 of Figure 7;

Figure 9 is a section on the line 9—9 of Figure 1;

Figure 10 is a section on the line 10—10 of Figure 1;

Figure 11 is a detail plan view showing the carrier and its feed screw;

Figure 12 is a section on the line 12—12 of Figure 11;

Figure 13 is a section on the line 13—13 of Figure 1, and

Figures 14 and 15 are detail sections of the volute.

Reference to these views will now be made by use of like characters that are employed to designate corresponding parts throughout.

In Figure 1 is shown a substantially box-like casing 1 within which is formed a similar but smaller structure 2 spaced from the top, bottom and end walls of the casing 1. For purposes of illustration and description, the left hand end of Figure 1 will be designated the forward end. From this end of the casing 1, at the upper edge, a ledge is extended forwardly as indicated by the numeral 3, in the same plane as the top wall 4 of the casing. However, the space 5 between the forward walls of the structures 1 and 2 is not covered in this plane. A roof 6 is supported over the surfaces 3 and 4, spaced from and parallel to the latter, and terminates short of the rear end of the surface 4, leaving a shallow box-like space 7 through which the latter is accessible, for a purpose that will presently be described.

Below the roof 6 is a rectangular frame adapted to receive a flat form or slab and constructed in any suitable manner for this purpose, for example, by securing four angle irons 8 together to form a rectangular enclosure. One of the angle irons is extended and formed as a nut 9 (Figure 11) and receives a screw shaft 10 threaded in the nut and journaled beneath and lengthwise of the roof 6, extending also along the space 7. The last named angle iron 8 and the one parallel thereto are so dimensioned as to seal the space 7 while traveling therein, as may be seen in Figures 1 and 12. They are in the nature of sealing dams. As may be seen in Figure 1, these dams are so spaced that one or the other always seals the space between the top wall 4 and the roof 6. At the forward end of the ledge 3 (Figure 5) is supported an electric motor 11 suitably connected to drive the shaft 10 through a gear box 12.

The shaft 10 when rotating is adapted to propel the carrier 8 from the ledge 3 to the space 7 where the form or slab 13 is placed in the frame or carrier. At the forward end of the ledge 3 and the rear end of the top wall 4 are limit switches 14 which, when engaged by the carrier in its end positions, reverses the direction of the motor and feed screw. The form 13 is placed in the carrier face downward so that the face is exposed to the space 5 during the movement of the carrier, for a purpose that will presently be described.

A vertical nozzle 15 is built in the space 5 extending from top to bottom and across the transverse center of the space, as shown more clearly in Figure 13. The nozzle is open at the lower end of its rear wall, as indicated by the numeral 16 in Figure 1. The upper end of the nozzle, or discharge end, is approximately in the plane of the surfaces 3 and 4, where it is adapted to discharge against the lower surface of the form 13.

A false bottom 17 is built above the floor 18 of the casing 1, with a forward transverse wall 19 extending from the forward end of the member 17 nearly into contact with the floor 18. The wall 19 is placed rearward of the nozzle 15 and forms therewith a pick-up chamber 20. Pulleys 21 are mounted respectively in the pick-up chamber and in the rear lower corner of the casing 1. Over these pulleys is trained a screen belt 22 which passes rather snugly between the lower edge of the wall 19 and the floor 18. A quantity of powder reagent or graphite, adapted to render the lower surface of the form 13 conductive, is maintained behind the wall 19 and on the lower lap of the screen belt, as indicated by the numeral 23. It may be seen in Figure 1 that the lower lap of the screen belt practically drags along the floor 18.

A conventional centrifugal blower 24 with radial blades 25, is mounted on a side of the casing 1 and communicating with the space 5 through a port 26 in the side wall (Figure 7) and is spaced from the bottom of the casing approximately one-third the height of the casing. From the bottom of the port, a separating plate 27 is extended horizontally across the space 5, surrounding nozzle 15 and separating the space into two air-tight compartments. The blower is preferably driven by a separate electric motor 28.

The blower draws from the port 26 and space 5 and discharges into a tangential pipe 29 extending upwardly to a volute 30 also mounted on the housing 1 and above the blower 24.

The volute housing 30 contains a disk 31 and an annulus 32 of equal external diameter and co-axial with but smaller than the housing 30. The members 31 and 32 support between them, peripherally, a number of spaced curved vanes 33.

In the operation of the device as thus far described, the action of the blower creates a suction in the space 5 and also upwardly in the nozzle 15, the upper end of which is open to the space. The screen belt 22, driven in the direction indicated in Figure 1 by a low speed motor 34 (Figure 6) connected to the pulleys 21, drags powder into the pick-up chamber 20 from which the powder is drawn upwardly in the nozzle, and against the lower space of the form 13 as the latter is propelled across the top of the nozzle. Some of the powder adheres to the form, and the remainder falls back into the space 5, accumulating on the plate 27. The powder may be graphite which renders the lower surface of the form 13 electrically conductive by merely adhering thereto, or it may be a reagent that reacts with a solution subsequently applied to the form to produce a conductive surface, as described in my co-pending application, Serial #202,674, filed April 18, 1938.

The blower draws the excess powder out of the space 5 and discharges it into the volute tangentially to the housing 30 of the latter, as may be seen in Figure 5. The described construction of the volute causes the powder to be separated from the air and to settle toward the periphery of the housing, while about 90% of the air is discharged between the vanes 33, through the annulus 32 to a port 35 (Figure 1) leading to the space 36 between the structures 1 and 2. It is to be noted that this space is sealed from the upper portion of the space 5 by the forward wall of the inner casing 2, as indicated by the numeral 37 in Figure 1, and from the lower portion of the space 5 by the separating plate 27.

In the rear portion of the device is provided a cyclone separator including a tray 38 suspended from the top of the inner casing 2 and a funnel 39 suspended from the tray and extending through the bottom of the casing 2 to a point slightly above the upper lap of the screen belt 22. A scraper tube 40, with its mouth in the bottom of the volute 30, extends to the top of the funnel 39. The remaining 10% of air and approximately 99% of the powder entering the volute is delivered through the pipe 40 to the funnel 39. The top of the funnel is closed to the tray 38 except for a depending return pipe 41. The air and powder are whirled in the funnel, and the major part of the solid matter drops to the screen belt 22. From the tray 38, a suction pipe 42 is extended to one of the end walls of the chamber 5, just above the plate 27, and is there drawn into communication with the chamber 5 through a header 43 (Figure 10) and ports 44 in the last named wall. The air conveying circuit is thus completed, some of the air discharged by the volute being returned through pipe 41, tray 38 and pipe 42 to the suction side of the blower, and the major portion of the air being discharged into space 36 and traveling along this space to the pick-up chamber and to the nozzle 15.

A small quantity of the powder also travels along the space 36. A means is provided for positively returning this quantity to the belt 22. This means consists of a power pack 45 positioned in the lower rear corner of the inner casing 2 and having an ionizing electrode wire 46 extending longitudinally across the space 36 with its ends insulated from the end walls of the space 36. On the parallel walls, and directly opposite the electrode 46 are electrodes 47 which are grounded through the casings. The electrode 46 receives a negative charge from the power pack 45 at 10,000 to 30,000 volts, and the powder passing through space 36 is thereby charged negatively at the voltage of electrode 46.

A ventilating box 48 is supported in the space 36 at the forward lower corner thereof, for a purpose that will presently appear. A screen 49 extends from the box to the rear lower corner of the casing 2 and is electrically insulated from both parts by suitable insulators 50. The funnel 39 also passes through the screen 49 but is electrically insulated therefrom. A contact 51 from the power pack 45 engages the screen 49 and charges the latter negatively at 5,000 to 20,000 volts. The screen 49 lies over the upper lap of the screen belt 22, and the particles charged negatively at the poles 46, 47 are repelled by the negatively charged screen 49 against the upper lap of belt 22.

These particles are carried rearwardly by the belt along the false bottom 17. The latter terminates short of the rear pulley 21, and between the rear edge of the member 17 and the rear pulley 21 is a scraper 52 spaced from both parts and engaging the upper lap of the belt 22. This scraper causes the particles on the belt to fall through the upper lap and to the lower lap by which they are carried forwardly and accumulated behind the wall 19. From this accumulation, the particles are fed to the pick-up chamber 20 in a quantity measured according to the speed of the belt and the carrying capacity of the belt while passing beneath the wall 19.

Some of the particles in the space 36 are so light, that, even when charged, they cannot be repelled. Such particles eventually find their way to the pick-up chamber or to the box 48 through ports 53 in the latter. A vent pipe 54 extends from the box to a suitable outside point.

The bottom of the tray 38 has an inwardly opening check valve 55 adjusted to open when the pressure in the tray is slightly below atmospheric pressure. Thus, a pressure not more than slightly below atmospheric is maintained in the tray. The pressure chamber 36 is necessarily airtight with respect to the atmosphere and the suction chamber 5, obtains some air by leakage around the angle iron 8. The solid contents are replenished through a door 56 provided at a suitable point in the casing 1, such as the lower part of the rear wall, as shown in Figure 1.

The apparatus and method described herein have the following advantages and characteristics:

1. The impingement of the powder against the form is produced by suction, the chamber 5 and communicating nozzle 15 being on the suction side of the blower.

2. The comparatively long impingement tube or nozzle allows ample time for acceleration of the particles.

3. The powder thrown against the form but not adhered thereto is returned to the supply position by electrostatic repulsion.

4. Placing the form face downward rather than face upward in the apparatus and impinging the particles upwardly against the face avoids accumulation of excess powder in the recesses of the face.

5. Unused powder is recovered and almost completely separated from the air by centrifugal action in the volute.

6. This separation reduces the concentration of powder in the chamber 36 below the explosion point before reaching the electrostatic separator.

7. The screen belt meters uniformly the proper amount of powder to be mixed with air in the pick-up chamber.

8. There is no loss of powder into the atmosphere immediately surrounding the apparatus, with complete elimination of occupational hazards resulting from the inhalation of powder-laden air. Cleanliness is another result of the same condition.

The apparatus and method described herein were primarily designed for applying a mixture of metal powder and graphite, such as the composition disclosed in the above mentioned co-pending application, by impingement. After such impingement, the treated surface is brought into contact with a metal solution toward which the reductant substance applied by impingement has a higher electrolytic potential than the metal or metals in the solution. The impinged metal may be zinc, aluminum, magnesium, or alloys of these mixed with a finely divided less electropositive metal such as tin, lead, copper, antimony, in the proportions disclosed in said co-pending application.

The principal advantage of such operation is that it provides a uniform coverage than can not be obtained in any other way, such as hand brushing followed by wet spraying or immersion, because of the labor costs and chemical instability of the powdered reagent in wet suspension. In other words, the powdered reagent decomposes in water. Such decomposition and difficulties resulting therefrom are avoided by the herein described method of applying the powdered reagent by impingement and then treating with the solution.

Although a specific embodiment of the invention has been illustrated and described, it will be understood that various alterations in the details of construction may be made without departing from the scope of the invention, as indicated by the appended claims.

What I claim is:

1. An apparatus of the character described comprising a suction chamber, a nozzle therein and having its tip exposed to said chamber, means for supporting the form opposite said tip, a pick-up chamber communicating with said nozzle and adapted to contain powdered material, a blower adapted to withdraw air and excess material from said suction chamber, and a separator into which said blower discharges, said separator being adapted to separate the material substantially from the air, and means for returning the separated material to said pick-up chamber, a conduit for receiving the separated air and a small quantity of material from said separator, means for electrically charging the material in said conduit, a fixed member in said conduit and connected to receive a like charge from said charging means, said member being positioned to repel said material to said returning means.

2. An apparatus of the character described comprising a suction chamber, a nozzle therein and having its tip exposed to said chamber, means for supporting the form opposite said tip, a pick-up chamber communicating with said nozzle and adapted to contain powdered material, a blower adapted to withdraw air and excess material from said suction chamber, and a separator into which said blower discharges, said separator being adapted to separate the material substantially from the air, a cyclone separator adapted to receive the separated material and a small quantity of air from the first named separator, and means for returning the material from the cyclone separator to said pick-up chamber, a conduit for receiving the separated air and a small quantity of material from the first named separator, means for electrically charging the material in said conduit, a fixed member in said conduit and connected to receive a like charge from said charging means, said member being positioned to repel said material to said returning means.

3. An apparatus of the character described comprising a suction chamber, a nozzle therein and having its tip exposed to said chamber, means for supporting the form opposite said tip, a pick-up chamber communicating with said nozzle and adapted to contain powdered material, a blower adapted to withdraw air and excess material from said suction chamber, and a separator into which said blower discharges, said separator being adapted to separate the material substantially from the air, a cyclone separator adapted to receive the separated material and a small quantity of air from the first named separator, a storage chamber, means for returning the separated material from the cyclone separator to said storage chamber, said means including a traveling screen belt passing through said storage and pick-up chambers and adapted to deliver material to said pick-up chamber at a uniform rate, a conduit for receiving the separated air and a small quantity of material from said separator, means for electrically charging the material in said conduit, a fixed member in said conduit and connected to receive a like charge from said charging means, said member being positioned to repel said material to said returning means.

4. The method of coating a dry wax form with powdered electrically conductive material having a density of at least 1.5 consisting in applying an air suspension of the material to the form through an elongated confined path in which the material is accelerated to such a velocity that it impinges against and is securely embedded in the form without adhesive, the acceleration being produced by reducing the pressure at the discharge end of said path while feeding the material to the nozzle at atmospheric pressure.

5. The method of coating a dry wax form with powdered electrically conductive material having a density of at least 1.5 consisting in applying an air suspension of the material to the form through an elongated confined path in which the material is accelerated to such a velocity that it impinges against and is securely embedded in the form without adhesive, feeding the material to the nozzle at a uniform rate and at atmospheric pressure, the acceleration being produced by reducing the pressure at the discharge end of said path.

6. An apparatus for coating dry wax surfaces with powdered electroconductive material, comprising a closed impingement chamber and a communicating low pressure chamber, an elongated nozzle in said low pressure chamber and having its tip exposed in said impingement chamber, means for supporting a form in said impingement chamber directly opposite the tip of said nozzle and at one end of said low pressure chamber, a supply chamber adapted to contain powdered material and communicating with the other end of said nozzle, means for maintaining the pressure of said supply chamber near atmospheric pressure, and means for reducing the pressure in said low pressure and impingement chambers, whereby material is conveyed from the supply chamber through the nozzle and impinged at high velocity directly against the form in the impingement chamber and the excess material deflected from said form into said low pressure chamber, a shallow box-like sealing chamber disposed laterally of the tip of said nozzle, a movable form support, means for passing said support through said sealing chamber, sealing dams at either end of said form support and so spaced that one or the other is positioned in the sealing chamber at all times, to substantially prevent the entrance of unwanted air to the impingement chamber.

7. An apparatus for coating dry wax surfaces with powdered electroconductive material, comprising a closed impingement chamber and a communicating low pressure chamber, an elongated nozzle in said low pressure chamber and having its tip exposed in said impingement chamber, means for supporting a form in said impingement chamber directly opposite the tip of said nozzle and at one end of said low pressure chamber, a supply chamber adapted to contain powdered material and communicating with the other end of said nozzle, means for maintaining the pressure of said supply chamber near atmospheric pressure, and means for reducing the pressure in said low pressure and impingement chambers, whereby material is conveyed from the supply chamber through the nozzle and impinged at high velocity directly against the form in the impingement chamber and the excess material deflected from said form into said low pressure chamber, a positive means for continuous exact proportioning of the amount of powder fed to the nozzle, said proportioning device including a traveling screen belt passing through the powder supply chamber and through the air stream entering the nozzle, and a scraper dam over said screen between said supply chamber and air stream.

BERTRAM C. KATHE.